US012361516B2

(12) United States Patent
Liu et al.

(10) Patent No.: US 12,361,516 B2
(45) Date of Patent: Jul. 15, 2025

(54) TACTILE PATTERN SUPER RESOLUTION RECONSTRUCTION METHOD AND ACQUISITION SYSTEM

(71) Applicant: DALIAN UNIVERSITY OF TECHNOLOGY, Liaoning (CN)

(72) Inventors: Qian Liu, Liaoning (CN); Bing Wu, Liaoning (CN); Qiang Zhang, Liaoning (CN); Xiaopeng Wei, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 0 days.

(21) Appl. No.: 18/004,800

(22) PCT Filed: Jun. 15, 2022

(86) PCT No.: PCT/CN2022/098789
§ 371 (c)(1),
(2) Date: Jan. 9, 2023

(87) PCT Pub. No.: WO2023/206745
PCT Pub. Date: Nov. 2, 2023

(65) Prior Publication Data
US 2024/0257304 A1  Aug. 1, 2024

(30) Foreign Application Priority Data
Apr. 26, 2022  (CN) .......................... 202210450174.2

(51) Int. Cl.
*G06T 3/4053* (2024.01)
*B25J 9/16* (2006.01)
*G06T 3/4046* (2024.01)

(52) U.S. Cl.
CPC ............. *G06T 3/4053* (2013.01); *B25J 9/163* (2013.01); *B25J 9/1694* (2013.01); *G06T 3/4046* (2013.01)

(58) Field of Classification Search
CPC ...... B25J 13/084; B25J 9/1694; B25J 9/1612; B25J 9/163; B25J 9/1664; B25J 13/082;
(Continued)

(56) References Cited

U.S. PATENT DOCUMENTS

| 2017/0182657 A1* | 6/2017 | Rose ..................... B25J 15/0028 |
| 2018/0075581 A1* | 3/2018 | Shi .......................... G06N 3/045 |

(Continued)

FOREIGN PATENT DOCUMENTS

| CN | 111062872 A | 4/2020 |
| CN | 113269677 A | 8/2021 |
| WO | WO-2011014810 A1 * | 2/2011 ............... G01B 5/20 |

*Primary Examiner* — Khoi H Tran
*Assistant Examiner* — Alyse Tramanh Tran
(74) *Attorney, Agent, or Firm* — Jacob M. Ward; Ward Law Office LLC

(57) ABSTRACT

The present disclosure relates to a tactile pattern Super Resolution (SR) reconstruction method and acquisition system, which belong to the field of tactile perception. First, a High Resolution (HR) tactile pattern sample is obtained by using a Low Resolution (LR) tactile sensor; then, a deep learning-based tactile SR model is trained by using a tactile SR data set; and finally, reconstructing the tactile data of a contact surface to be measured as an SR tactile pattern by using the tactile SR model. The present disclosure uses the existing taxel-based LR tactile sensor and adopts a deep learning-based tactile SR reconstruction technology, which can effectively restore the shape of the contact surface, improves the resolution of the tactile sensor, and meanwhile, maintains the characteristics of the sensor being light, flexible, and easy to be integrated into devices, such as a robot.

6 Claims, 8 Drawing Sheets

(58) Field of Classification Search
CPC .......... G06N 3/045; G06N 3/08; G06N 3/044; G06N 20/00; G06T 3/4053; G06T 3/4046; G06T 7/55; G05B 2219/40625; G05B 19/4155; G05B 2219/39021
See application file for complete search history.

(56) References Cited

U.S. PATENT DOCUMENTS

| | | | |
|---|---|---|---|
| 2021/0122039 A1* | 4/2021 | Su | B25J 13/084 |
| 2022/0084241 A1 | 3/2022 | Dikhale et al. | |
| 2022/0367040 A1* | 11/2022 | Sutherland | G06N 3/0455 |
| 2023/0063246 A1* | 3/2023 | Flessas | A61H 19/44 |

* cited by examiner

TACTILE PATTERN SUPER RESOLUTION RECONSTRUCTION METHOD AND ACQUISITION SYSTEM

CROSS REFERENCE TO RELATED APPLICATION

This patent application claims the benefit and priority of International Patent No. PCT/CN2022/098789, filed on Jun. 15, 2022, which claims the benefit of Chinese Patent Application No. 202210450174.2 filed on Apr. 26, 2022, and entitled "TACTILE PATTERN SUPER RESOLUTION RECONSTRUCTION METHOD AND ACQUISITION SYSTEM", the entire disclosures of which are incorporated by reference herein.

TECHNICAL FIELD

The present disclosure belongs to the field of tactile perception, and in particular, to a tactile pattern Super Resolution (SR) reconstruction method and acquisition system.

BACKGROUND ART

A tactile sensor is a sensor that can acquire tactile information, such as force distribution and surface texture of a contact surface. At present, mainstream tactile sensors can be divided into two types. The first type is vision-based tactile sensors, and the other type is taxel-based tactile sensors. The vision-based tactile sensors capture the deformation of the contact surface as tactile information by means of a camera. Typical products include Gelsight tactile sensors of Massachusetts Institute of Technology, TacTip tactile sensors of Bristol University, and DIGIT tactile sensors of Meta Company. Because the camera needs a certain space, these sensors are bulky and difficult to be integrated into devices, such as robots, and do not conform to human tactile perception behaviors. The taxel-based tactile sensors combine a plurality of taxels. Each taxel represents the tactile information within a certain area, and the distance between two adjacent taxels is defined as the tactile resolution of the sensor. Typical products include uSkin triaxial force tactile sensors of Xela Robotic Company and Contactile tactile sensors of Contactile Company. This type of tactile sensors can directly measure the force and displacement information distribution in a contact process. However, since the current manufacturing process is limited, the resolution of the sensor (the distance between two taxels) is much lower than that of the vision-based tactile sensor. With the improvement of the resolution of the sensor, a series of problems, such as more connecting wires and lower response frequency, will also be brought, and Crosstalk between devices will also be also amplified.

SR refers to a technology that can restore Low Resolution (LR) data into High Resolution (HR) data. It has been studied and applied in the fields of computer vision (pattern SR and video SR) and audio (audio SR), but rarely studied in the field of tactile sense. The tactile SR technology can acquire HR tactile information by only using the existing LR tactile sensors, so that the taxel-based tactile sensor can obtain HR tactile information, and meanwhile, still ensures the characteristics of a sensor being light, flexible, and easy to be integrated into a robot device.

Therefore, how to improve the tactile information resolution acquired by a tactile sensor by using the SR technology is a technical problem to be solved urgently at present.

SUMMARY

An objective of the present disclosure is to provide a tactile pattern SR reconstruction method and acquisition system, so as to improve the tactile information resolution of a tactile sensor.

To achieve the objective, the present disclosure provides the following solutions:

A tactile pattern SR reconstruction method includes:
performing sampling on each contact surface for a plurality of times by using a tactile sensor, so as to obtain tactile data and coordinates of the center point of the tactile sensor at each sampling of each contact surface;
registering all sampled tactile data of each contact surface according to the coordinates of the center point of the tactile sensor at each sampling, so as to obtain an HR tactile pattern sample corresponding to the contact surface;
selecting the tactile data sampled each time in a central area of the contact surface and the HR tactile pattern sample corresponding to the contact surface to form a data pair, and constructing a tactile SR data set;
training a deep learning neural network model by using a supervised machine learning method according to the tactile SR data set, so as to obtain a tactile SR model; and
inputting the tactile data, acquired by the tactile sensor, of a contact surface to be measured into a tactile SR model, and outputting an HR tactile pattern of the contact surface to be measured.

Optionally, the performing sampling on each contact surface for a plurality of times by using a tactile sensor, so as to obtain tactile data and coordinates of the center point of the tactile sensor at each sampling of each contact surface specifically includes:
setting the acquisition times I along an X axis and the acquisition times J along a Y axis of a robotic arm;
respectively determining the preset distance $\Delta x$ of the tactile sensor moving once along the X axis and the preset distance $\Delta y$ of the tactile sensor moving once along the Y axis according to the resolution of the tactile sensor, the acquisition times I, and the acquisition times J;
mounting the tactile sensor at an end the robotic arm;
presetting a sampling position (x, y, $h_{init}$) (0, 0, $h_{init}$), where $h_{init}$ is the vertical distance from the tactile sensor to the contact surface;
enabling the robotic arm to drive the tactile sensor to move to a sampling position (x, y, $h_{init}$) above the contact surface, simultaneously, adjusting the Z axis at the end of the robotic arm to be perpendicular to a horizontal plane, and recording the coordinates of the center point of the tactile sensor;
controlling the robotic arm to move downward until the tactile sensor is in contact with the contact surface, and acquiring a plurality of sets of tactile data;
enabling the robotic arm to move upward to return to the sampling position (x, y, $h_{init}$), so as to complete the $$\left[\frac{x}{\Delta x}, \frac{y}{\Delta y}\right]th$$

sampling;
increasing x by $\Delta x$, replacing the (x, y, $h_{init}$) with (x+$\Delta x$, y, $h_{init}$), returning to the step of "enabling the robotic arm to drive the tactile sensor to move to a sampling position (x, y, $h_{init}$) above the contact surface, and simultaneously, adjusting the Z axis at the end of the robotic arm to be perpendicular to a horizontal plane", until $$\frac{x + \Delta x}{\Delta x} > I,$$

and controlling the robotic arm to return to the sampling position (x, y, $h_{init}$); and increasing y by $\Delta y$, replacing the (x, y, $h_{init}$) with (x, y+$\Delta y$, $h_{init}$), returning to the step of "enabling the robotic arm to drive the tactile sensor to move to a sampling position (x, y, $h_{init}$) above the contact surface, and simultaneously, adjusting the Z axis at the end of the robotic arm to be perpendicular to a horizontal plane", until $$\frac{y + \Delta y}{\Delta y} > J,$$

stopping sampling, and obtaining the tactile data and coordinates of the center point of the tactile sensor at each sampling of the contact surface.

Optionally, the respectively determining the preset distance $\Delta x$ of the tactile sensor moving once along the X axis and the preset distance $\Delta y$ of the tactile sensor moving once along the Y axis according to the resolution, the acquisition times I, and the acquisition times J of the tactile sensor specifically includes:

determining the preset distance $\Delta x$ of the tactile sensor moving once along the X axis by using a formula d=$\Delta x \times I$ according to the resolution of the tactile sensor and the acquisition times I, where d represents the distance between adjacent taxels on the tactile sensor; and determining the preset distance $\Delta y$ of the tactile sensor moving once along the Y axis by using a formula d=$\Delta y \times J$ according to the resolution of the tactile sensor and the acquisition times J.

Optionally, the registering all sampled tactile data of each contact surface according to the coordinates of the center point of the tactile sensor at each sampling, so as to obtain an HR tactile pattern sample corresponding to the contact surface specifically includes:

averaging the plurality of sets of tactile data acquired at each sampling after high pass filtering, and taking an average value as the tactile data of each sampling;

registering by using a formula $T^{HR}$ [I×m+, J×n+j]=$T^{i,j}$[m, n] according to the tactile data of each sampling of each contact surface and the coordinates of the center point of the tactile sensor, so as to obtain an initial HR tactile pattern sample, where [m, n] represents the [m, n]th taxel of the tactile sensor, $T^{HR}$ [I×m+i, J×n+j] represents the x, y, and z-axis data corresponding to the [I×m+i, J×n+j]th pixel point of the HR tactile pattern, $T^{i,j}$[m, n] represents the x, y, and z-axis data corresponding to the [m, n]th taxel when the tactile sensor samples for the ith time along the X axis and samples for the jth time along the Y axis; and performing smoothing processing on the initial HR tactile pattern sample to obtain an HR tactile pattern sample of the contact surface.

Optionally, the selecting the tactile data sampled each time in a central area of the contact surface and the HR tactile pattern sample corresponding to the contact surface to form a data pair, and constructing a tactile SR data set specifically includes:

selecting the tactile data acquired when the contact surface is within the range $$i \in \left\{ \left\lfloor \frac{I}{2} \right\rfloor - \frac{K}{2}, \left\lfloor \frac{I}{2} \right\rfloor + \frac{K}{2} \right\} \text{ and } j \in \left\{ \left\lfloor \frac{J}{2} \right\rfloor - \frac{K}{2}, \left\lfloor \frac{J}{2} \right\rfloor + \frac{K}{2} \right\}$$

as an input, and the HR tactile pattern sample of each contact surface as a tag, and constructing a tactile SR data set.

Where, $\lfloor \ \rfloor$ represents rounding down, and K represents a coefficient that an error between LR and HR tactile data may be negligible within a preset range. The greater the K is, the higher the tolerance to an error is, which is generally 4 or 6 in an experiment.

Optionally, the deep learning neural network model is a convolutional neural network-based deep learning model or a generative adversarial network-based deep learning model.

Each of the convolutional neural network-based deep learning model and the generative adversarial network-based deep learning model includes an upsampling layer, a feature extraction layer, and an output layer connected in sequence.

A loss function of the convolutional neural network-based deep learning model is $$\mathcal{L}_{CNN} = \mathcal{L}_{MSE} = \frac{1}{(M \times I) \times (N \times J)} \sum_{m=1}^{M} \sum_{n=1}^{N} \left( G_{\theta_G}(T^{LR}), T^{HR} \right)^2,$$

where (M, N) represents the resolution of the tactile sensor, $\mathcal{L}_{CNN}$ represents the loss of the convolutional neural network-based deep learning model, $\mathcal{L}_{MSE}$ represents a mean $\mathcal{L}$ square error, $G_{\theta_G}(T^{LR})$ represents the HR tactile pattern predicted by the model, and $T^{HR}$ represents a real HR tactile pattern.

A loss function of the generative adversarial network-based deep learning model is $$\mathcal{L}_{GAN} = \mathcal{L}_{MSE} + 10^{-3} \cdot \mathcal{L}_{Gen} = \mathcal{L}_{MSE} + 10^{-3} \cdot \sum -\log D_{\theta_D}\left( G_{\theta_G}(T^{LR}_{x,y,z}) \right),$$

where $\mathcal{L}_{GAN}$ represents the loss of the generative adversarial network-based deep learning model, $\mathcal{L}_{GAN}$ represents an adversarial loss term, $T^{LR}_{x,y,z}$ represents original LR x, y, z-axis tactile data acquired by the tactile sensor, $G_{\theta_G}(T^{LR}_{x,y,z})$ represents an HR tactile pattern generated (predicted) by a generative network, and $D_{\theta_D}(G_{\theta_G}(T^{LR}_{x,y,z}))$ represents the difference, determined by a discriminant network, between the predicted HR tactile pattern and the real HR tactile pattern.

A tactile pattern SR acquisition system includes a robotic arm, a tactile sensor, and an upper Personal Computer (PC).

The tactile sensor is mounted at an end of the robotic arm.

Both a control end and a signal output end of the robotic arm are connected to the upper PC. The upper PC is used for receiving the coordinates of the center point of the tactile sensor and controlling the robotic arm to move according to a preset acquisition path according to the coordinates of the center point of the tactile sensor.

A signal output end of the tactile sensor is connected to the upper PC. The upper PC is used for receiving the tactile data, acquired by the tactile sensor, of the contact surface after the tactile sensor is in contact with the contact surface, and reconstructing an HR tactile pattern of the contact surface according to the tactile data and the coordinates of the center point of the tactile sensor.

Optionally, the upper PC includes:
a sampling module, used for obtaining tactile data and coordinates of the center point of a tactile sensor at each sampling of each contact surface;
a tag acquisition module, used for registering all sampled tactile data of each contact surface according to the coordinates of the center point of the tactile sensor at each sampling, so as to obtain an HR tactile pattern sample corresponding to the contact surface;
a data set construction module, used for selecting the tactile data sampled each time in a central area of the contact surface and the HR tactile pattern sample corresponding to the contact surface to form a data pair, and constructing a tactile SR data set;
a training module, used for training a deep learning neural network model by using a supervised machine learning method according to the tactile SR data set, so as to obtain a tactile SR model; and
an application module, used for inputting the tactile data, acquired by the tactile sensor, of a contact surface to be measured into an SR model, and outputting an HR tactile pattern of the contact surface to be measured.

The present disclosure has the following beneficial effects.

The present disclosure relates to a tactile pattern SR reconstruction method and acquisition system. First, an HR tactile pattern sample is obtained by using an LR tactile sensor; then, a deep learning-based tactile SR model is trained by using a tactile SR data set; and finally, reconstructing the tactile data of a contact surface to be measured as a SR tactile pattern by using the tactile SR model. The present disclosure only uses the existing taxel-based LR tactile sensor and adopts a deep learning-based tactile SR reconstruction technology, which can effectively restore the shape of the contact surface, improves the resolution of the tactile sensor, and meanwhile, still maintains the characteristics of the sensor being light, flexible, and easy to be integrated into devices, such as a robot.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description show merely some embodiments of the present disclosure, and those of ordinary skill in the art may still derive other drawings from these drawings without creative efforts.

FIG. 3A is a schematic diagram when an end of a robotic arm is located at an acquisition position, FIG. 3B is a schematic diagram when a tactile sensor is in contact with a contact surface, FIG. 3C is a schematic diagram of the movement of the robotic arm after acquisition, and FIG. 3D is a schematic diagram of the robotic arm moving a preset distance Δx along an X axis;

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of the present disclosure is to provide a tactile pattern SR reconstruction method and acquisition system, so as to improve the tactile information resolution of a tactile sensor.

In order to make the abovementioned objective, features, and advantages of the present disclosure more apparent and more comprehensible, the present disclosure is further described in detail below with reference to the drawings and specific implementation modes.

Embodiment 1

Figure 1:
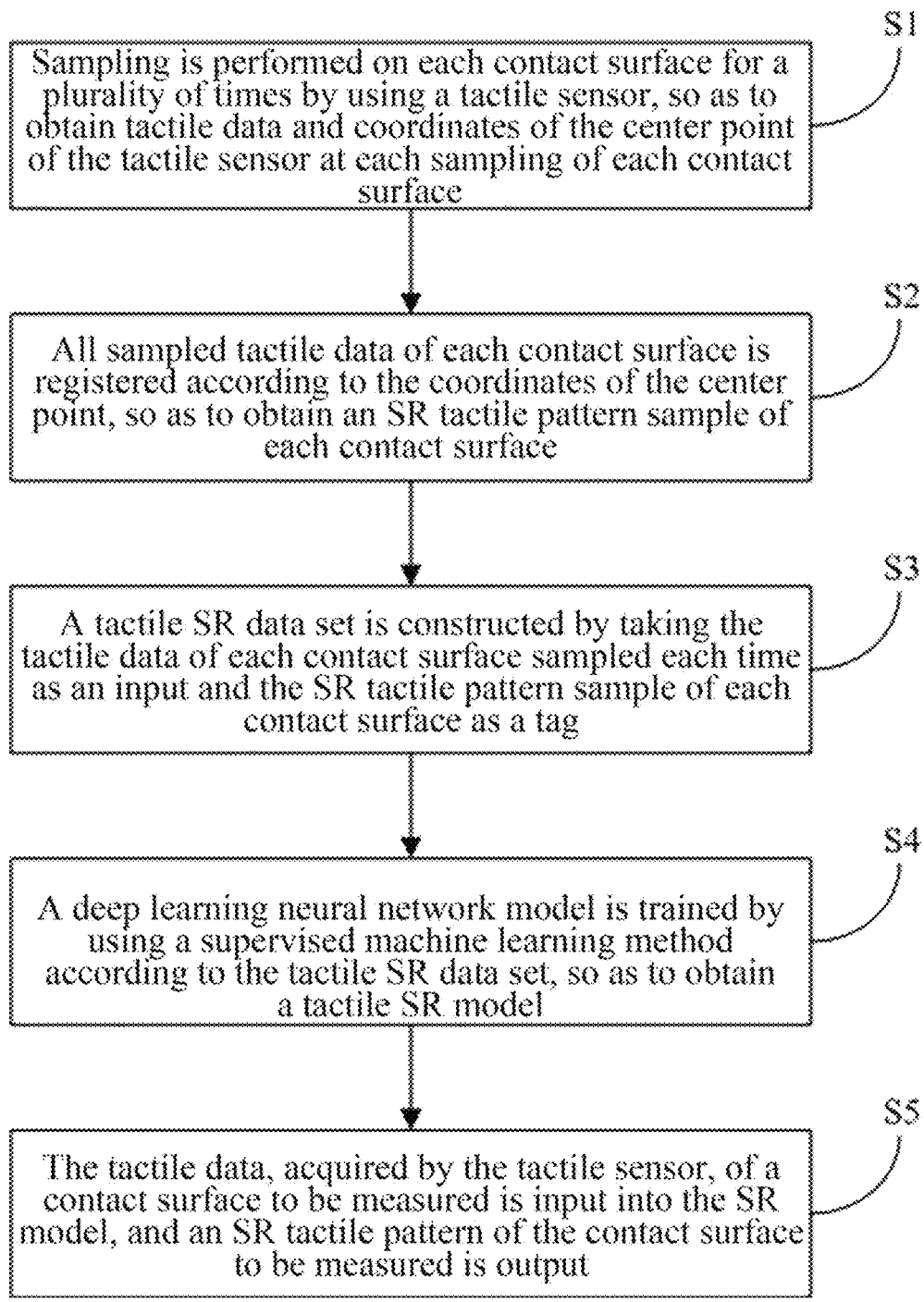
FIG. 1 is a flowchart of a tactile pattern SR reconstruction method provided by Embodiment 1 of the present disclosure.
Figure 2:
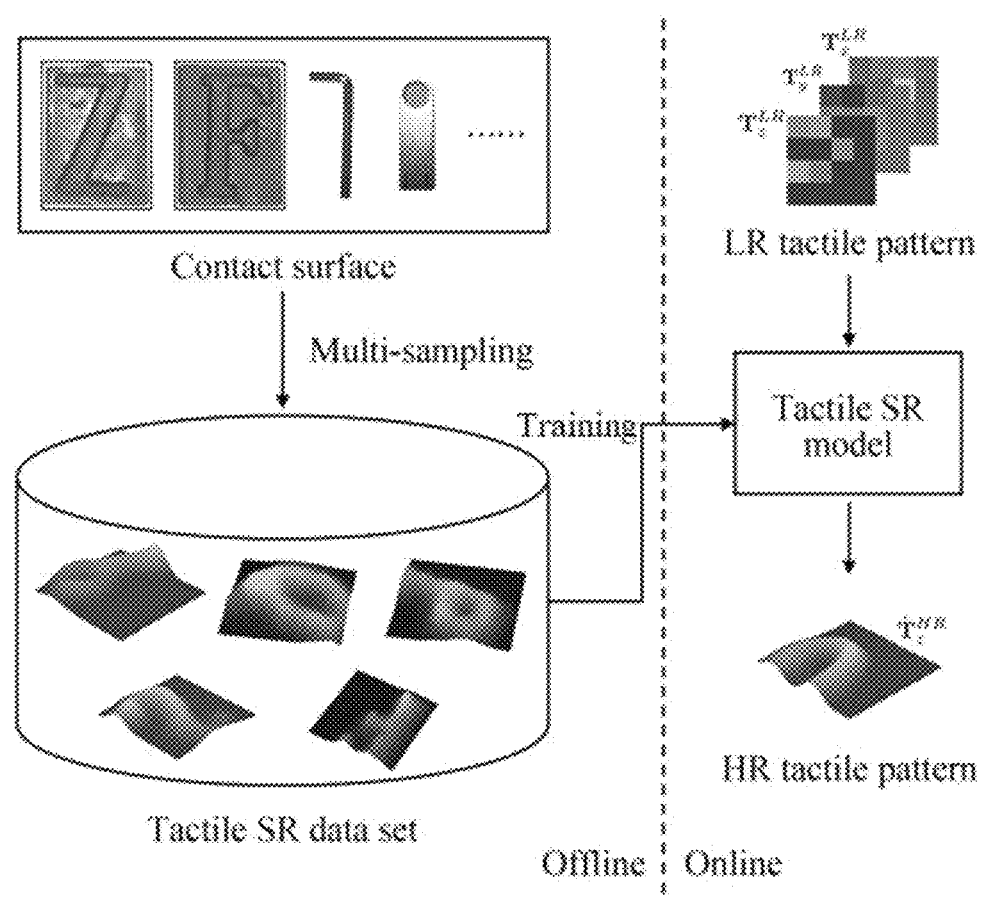
FIG. 2 is a schematic diagram of the tactile pattern SR reconstruction method provided by Embodiment 1 of the present disclosure.

The embodiment of the present disclosure provides a tactile pattern SR reconstruction method, as shown in FIG. 1 to FIG. 2, including the following steps.

S1, sampling is performed on each contact surface for a plurality of times by using a tactile sensor, so as to obtain tactile data and coordinates of the center point of the tactile sensor at each sampling of each contact surface.

The sampling is performed for a plurality of times by using the tactile sensor. The tactile sensor moves a short distance along an X axis (Y axis) at each sampling, and records the tactile data of the whole process and coordinates of the center point of the sensor.

The tactile data is acquired through the movement of the robotic arm, and a tactile sequence is obtained by sampling for a plurality of times. The whole acquisition process is as follows:

Step 1: the acquisition times I along an X axis and the acquisition times J along a Y axis of a robotic arm are set.

Step 2: the preset distance Δx of the tactile sensor moving once along the X axis and the preset distance Δy of the tactile sensor moving once along the Y axis are respectively determined according to the resolution of the tactile sensor, the acquisition times I, and the acquisition times J.

The original tactile sensor resolution is set as (M, N), that is, the tactile sensor has M×N independent taxels.

The preset distance Δx of the tactile sensor moving once along the X axis is determined by using a formula d=Δx×I according to the resolution of the tactile sensor and the acquisition times I, where d represents the distance between adjacent taxels on the tactile sensor.

The preset distance Δy of the tactile sensor moving once along the Y axis is determined by using a formula d=Δy×J according to the resolution of the tactile sensor and the acquisition times J.

Step 3: the tactile sensor is mounted at an end the robotic arm.

Step 4: the sampling position (x, y, $h_{init}$)=(0, 0, $h_{init}$) is preset. Where, the $h_{init}$ is the vertical distance from the tactile sensor to the contact surface.

Step 5: the robotic arm is enabled to drive the tactile sensor to move to a sampling position (x, y, $h_{init}$) above the contact surface, simultaneously, the Z axis at the end of the robotic arm is adjusted to be perpendicular to a horizontal plane, and the coordinates of the center point of the tactile sensor are recorded, as shown in FIG. 3A.

Figure 3:
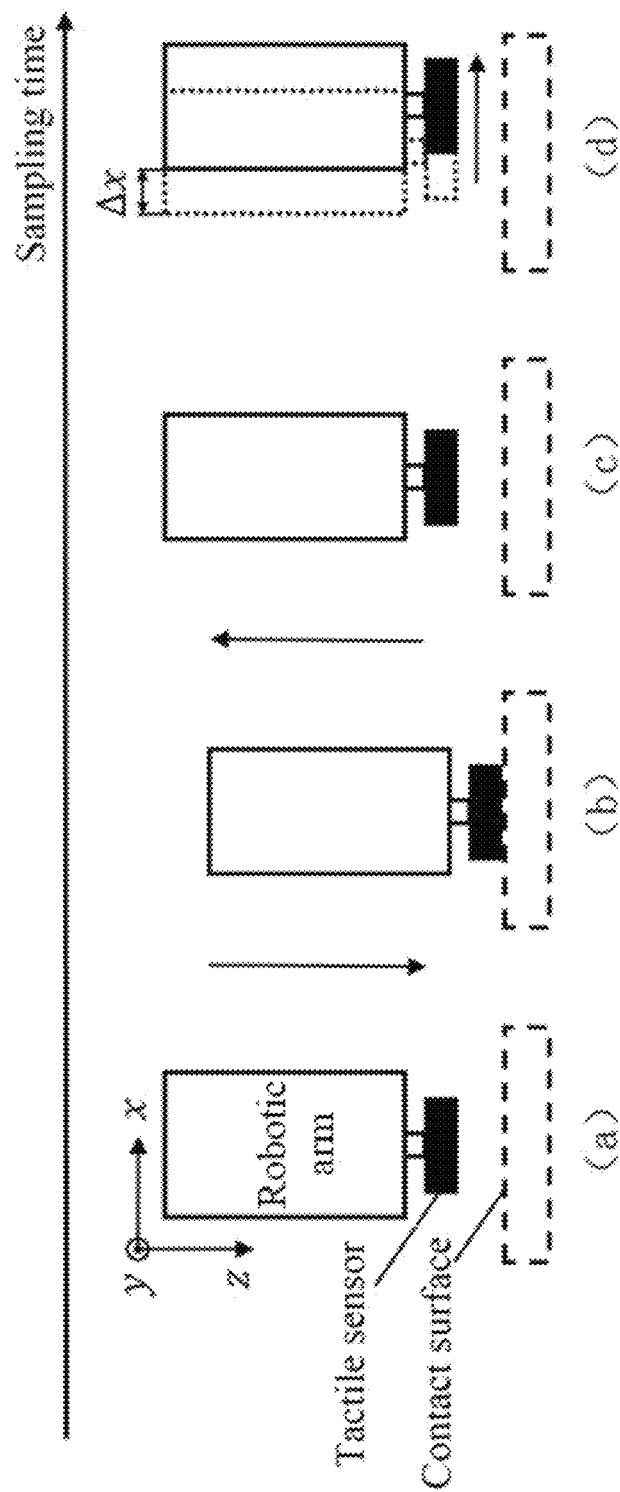
FIG. 3 is a schematic flowchart of single tactile data sampling provided by Embodiment 1 of the present disclosure.

Step 6: the robotic arm is controlled to move downward until the tactile sensor is in contact with the contact surface, and a plurality of sets of tactile data are acquired. The sensor is in contact with the contact surface. When a set threshold value is reached, the sensor stops moving for a period of time, so as to ensure that enough data during contact is acquired, as shown in FIG. 3 (b).

Step 7: the robotic arm is enabled to move upward to return to the sampling position (x, y, $h_{init}$), so as to complete the $$\left[\frac{x}{\Delta x}, \frac{y}{\Delta y}\right]$$

sampling, and the tactile sequence of the whole acquisition process is recorded, as shown in FIG. 3C.

Step 8: x is increased by Δx, the (x, y, $h_{init}$) is replaced with (x+Δx, y, $h_{init}$), the process is returned to the step that "the robotic arm is enabled to drive the tactile sensor to move to a sampling position (x, y, $h_{init}$) above the contact surface, and simultaneously, the Z axis at the end of the robotic arm is adjusted to be perpendicular to a horizontal plane", until $$\frac{x + \Delta x}{\Delta x} > I,$$

and the robotic arm is controlled to return to the sampling position (x, y, $h_{init}$), as shown in FIG. 3D.

Step 9: y is increased by Δy, the (x, y, $h_{init}$) is replaced with (x, y+Δy, $h_{init}$), the process is returned to the step that "the robotic arm is enabled to drive the tactile sensor to move to a sampling position (x, y, $h_{init}$) above the contact surface, and simultaneously, the Z axis at the end of the robotic arm is adjusted to be perpendicular to a horizontal plane", until $$\frac{y + \Delta y}{\Delta y} > J,$$

sampling is stopped, and the tactile data and coordinates of the center point of the tactile sensor at each sampling of the contact surface are obtained.

Figure 4:
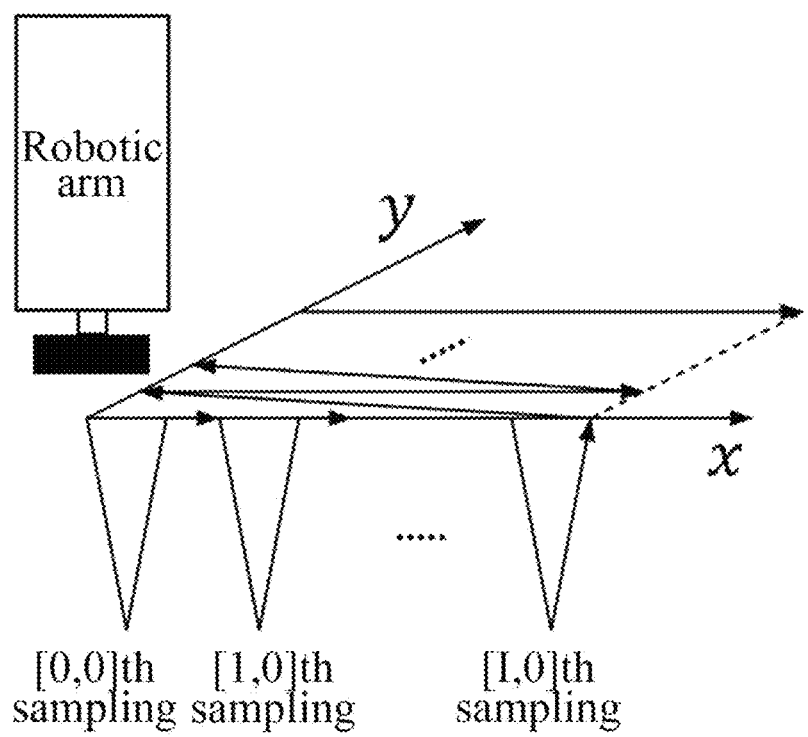
FIG. 4 is a movement trajectory diagram of a multi-sampling robotic arm provided by Embodiment 1 of the present disclosure.

That is, the robotic arm moves to an initial position, and the Z axis at the end of the robotic arm is perpendicular to the horizontal plane. The robotic arm moves downward slowly. The sensor is in contact with the contact surface. After the set threshold value is reached, the sensor stops moving for a period of time, so as to ensure that enough data during contact is acquired. The robotic arm moves upwards to the initial position to complete the [0, 0]th sampling process, and the tactile sequence of the whole acquisition process is recorded. The robotic arm moves a short distance Δx(Δy) along the X axis (Y axis) for performing the next acquisition. At this moment, the position information ($x_1$, $y_1$, $h_{init}$) of the center point of the sensor is recorded, and previous steps are repeated until the number of sampling is reached. The whole sampling movement trajectory is as shown in FIG. 4, and sampling is performed along a Z-shaped trajectory.

S2, all sampled tactile data of each contact surface is registered according to the coordinates of the center point of the tactile sensor at each sampling, so as to obtain an HR tactile pattern sample corresponding to the contact surface.

The LR tactile patterns are combined into an HR tactile pattern according to the acquired data and the position of the sensor. The original tactile sensor resolution is set as (M, N), that is, the sensor has M×N independent taxels. The sensor acquires for I times along the X axis, and acquires for J times along the Y axis. A tactile pattern with the resolution of (I×M, J×N) can be obtained by processing and registering the tactile data of the process.

A specific process is as follows:

Step 1: the tactile sequence is preprocessed: the plurality of sets of tactile data acquired at each sampling are averaged after high pass filtering, and an average value is taken as the tactile data of each sampling.

Considering one sampling process, how many times the sensor has acquired along the X axis and the Y axis at this time can be determined by using $$i, j = \frac{x_i - x_0}{\Delta x}, \frac{y_j - y_0}{\Delta y}.$$

Tactile information corresponding to a contact time is obtained by using high pass filtering and is averaged to eliminate the influence of the noise of the tactile sensor itself. Finally, LR tactile data $T^{i,j} \in R^{M \times N}$ is obtained. The LR tactile data $T^{i,j}$, i={0, 1, ..., I}, j={0, 1, ..., J} of the whole plurality of sampling processes can be obtained by repeating the abovementioned operations. Where, i, j represents the relative offset distance between the center of the sensor and the initial acquisition position.

Figure 8:
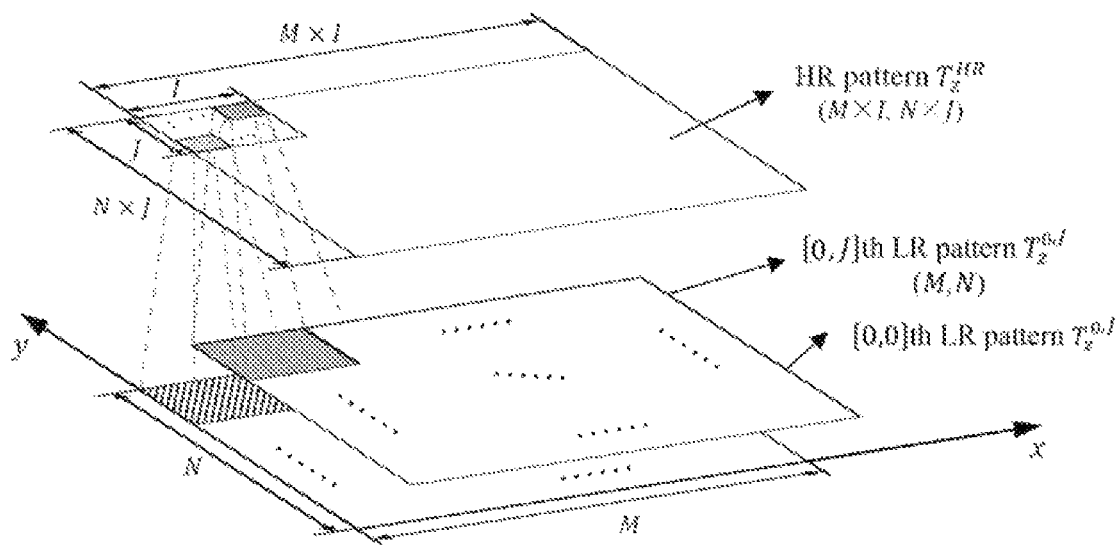
FIG. 8 is a schematic diagram of a pattern registration process provided by Embodiment 1 of the present disclosure.

Step 2: registration is performed by using the position information of the LR tactile pattern. FIG. 8 gives a registration process. Registration is performed by using a formula $T^{HR}$ [I×m+i, J×n+j]=$T^{i,j}$[m, n] according to the tactile data of each sampling of each contact surface and the coordinates of the center point of the tactile sensor, so as to obtain an initial HR tactile pattern sample, where [m, n] represents the [m, n]th taxel of the tactile sensor, $T^{HR}$ [I×m+i, J×n+j] represents the x, y, and z-axis data corresponding to the [I×m+i, J×n+j]th pixel point of the HR tactile pattern, $T^{i,j}$[m, n] represents the x, y, and z-axis data corresponding to the [m, n] th taxel when the tactile sensor samples for the ith time along the X axis and samples for the jth time along the Y axis.

Step 3: smoothing processing is performed on the initial HR tactile pattern sample to obtain an HR tactile pattern sample of each contact surface. Each taxel of the tactile sensor has its own characteristic curve, and the registered pattern has an obvious blocking effect, which can be obviously eliminated by the pattern after the smoothing processing.

Figure 5:
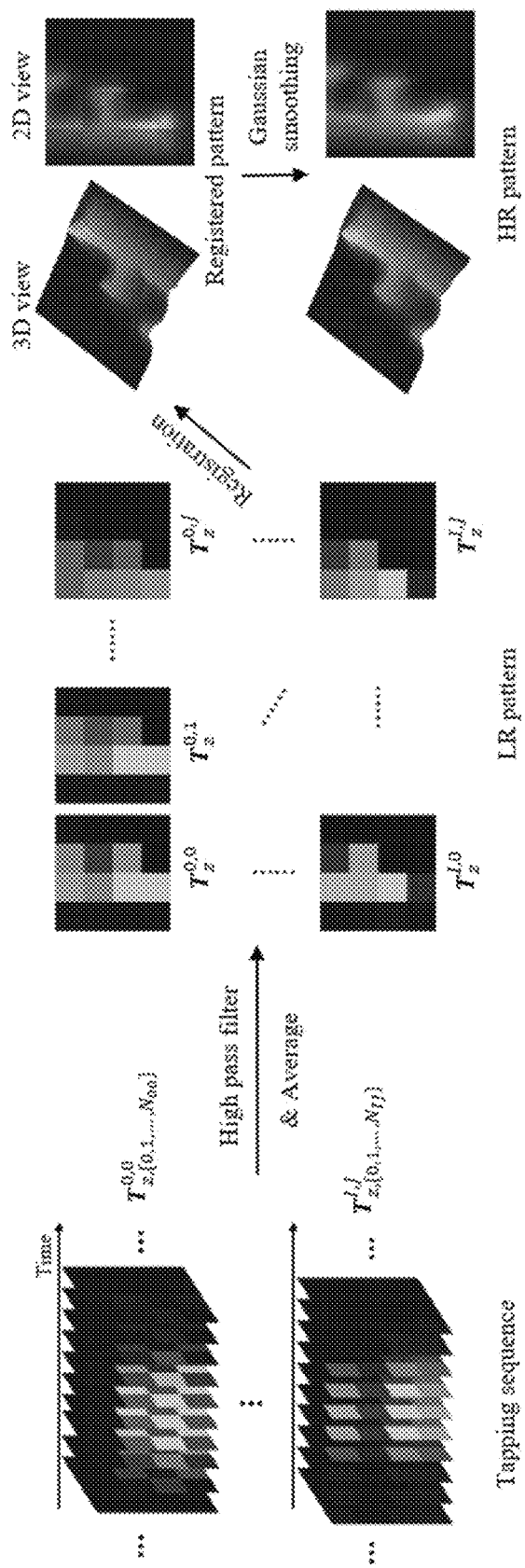
FIG. 5 is a schematic diagram of acquiring an HR tactile pattern sample provided by Embodiment 1 of the present disclosure.

Referring to FIG. 5, the left is: an original tactile sequence; the middle is: the tactile data of each contact surface (LR); and the right is: registered HR data, only one piece. That is, I×J LR patterns (LR) are registered into an HR pattern (HR).

S3, the original tactile data (that is, the LR data) close to the center of the contact surface and the corresponding HR tactile data are selected to form a data pair, and a tactile SR data set is constructed.

A piece of HR tactile data is formed by registering I×J pieces of original LR tactile patterns, so one HR pattern corresponds to I×J original LR tactile patterns. Because there is a certain difference between the HR tactile pattern obtained by registration and the contact area represented by the LR tactile pattern, they cannot be directly used as a data pair. During registering, there is a great difference (that is, i is close to 0 or I, and j is close to 0 or J) between the LR pattern located and the HR pattern at an edge position, and a little difference between the patterns located in a central position (when $$i = \left\lfloor \frac{I}{2} \right\rfloor, \text{ and } j = \left\lfloor \frac{J}{2} \right\rfloor,$$

the error is 0). We consider that this error is negligible in the middle position. K×K LR tactile patterns and HR patterns in total of $$i \in \left\{ \frac{I}{2} - \frac{K}{2}, \frac{I}{2} + \frac{K}{2} \right\} \text{ and } j \in \left\{ \frac{J}{2} - \frac{K}{2}, \frac{J}{2} + \frac{K}{2} \right\}$$

are selected as data pairs. $\lfloor \ \rfloor$ represents rounding down, and K represents a coefficient that an error between LR and HR tactile data may be negligible within a preset range. The greater the K is, the higher the tolerance to an error is, which is generally 4 or 6 in an experiment.

By the method, a tactile pattern with the resolution of (I×M, J×N) may be acquired by the tactile sensor with the original resolution of (M, N). That is, the greater the number of sampling is, the higher the acquired resolution is, but meanwhile, the requirement on the precision of the robotic arm is also higher.

S4, a deep learning neural network model is trained by using a supervised machine learning method according to the tactile SR data set, so as to obtain a tactile SR model.

The patent gives two deep learning-based SR models, which aim to illustrate the feasibility of the method. Any method based on supervised machine learning can be applied to the models, so as to improve the performance of tactile SR.

(1) Convolutional Neural Network-Based Tactile SR Model

Figure 6:
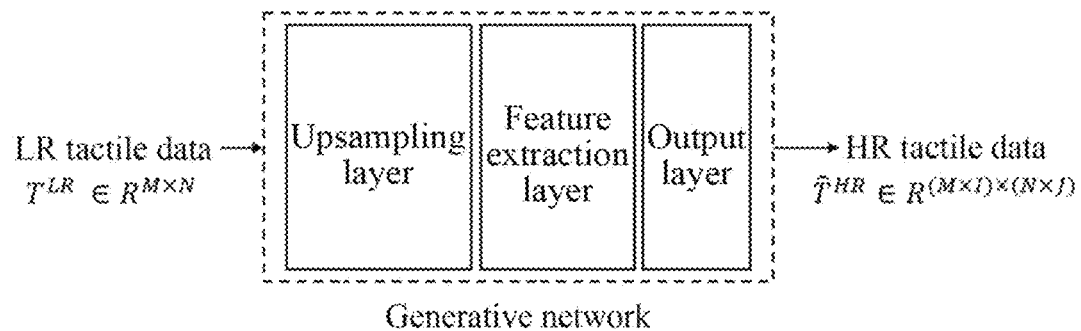
FIG. 6 is a frame diagram of a Convolutional Neural Network-based deep learning model provided by Embodiment 1 of the present disclosure.

A generative network part as shown in FIG. 6 includes three parts, that is, an upsampling layer, a feature extraction layer, and an output layer, in total. First, upsampling is performed on the input LR data, so that the dimension of the LR data is consistent with that of HR data; then, pattern feature is extracted; and finally, the output layer is used for adjusting the dimension of data. A Mean Square Error (MSE) is used as a loss function of the model, and the specific loss function is as follows:

$$\mathcal{L}_{CNN} = \mathcal{L}_{MSE} = \frac{1}{(M \times I) \times (N \times I)} \sum_{m=1}^{M} \sum_{n=1}^{N} \left( G_{\theta_G}(T^{LR}), T^{HR} \right)^2$$

Where, $G_{\theta_G}(T^{LR})$ represents an HR tactile pattern predicted by the model, and the loss function compares the difference between each pixel point of a real value and a predicted value.

(2) Generative Adversarial Network-Based Tactile SR Model

The model is consistent with the convolutional model network-based prediction model, and the difference lies in an adversarial loss term of an additive amount of the loss function. A specific loss is as follows:

$$\mathcal{L}_{GAN} = \mathcal{L}_{MSE} + 10^{-3} \cdot \mathcal{L}_{Gen} = \mathcal{L}_{MSE} + 10^{-3} \cdot \sum -\log D_{\theta_D}\left( G_{\theta_G}(T^{LR}_{x,y,z}) \right)$$

Figure 7:
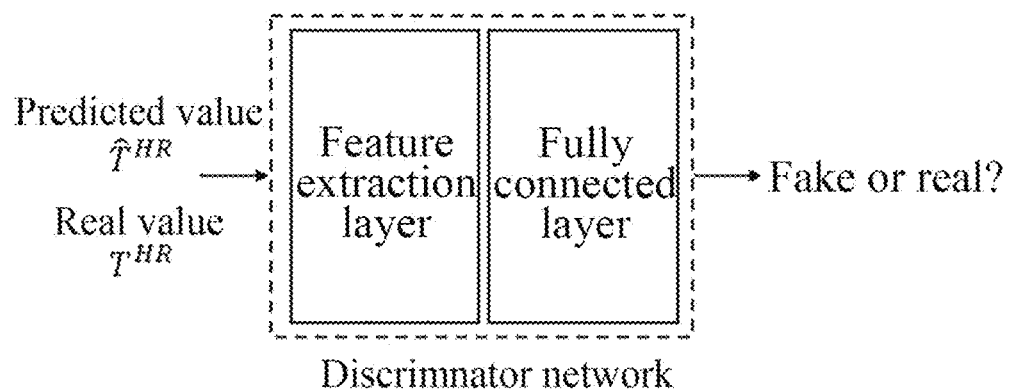
FIG. 7 is a frame diagram of a discriminant network for a generative adversarial network-based deep learning model provided by Embodiment 1 of the present disclosure.

Where, $\mathcal{L}_{Gen}$ represents the adversarial loss term, such as a discriminant network part of FIG. 7. That is, the HR tactile data predicted by the generative network and the real HR tactile data are input into the discriminant network, so that the network distinguishes which is the real data, thereby achieving the purpose of optimizing.

S5, the tactile data, acquired by the tactile sensor, of a contact surface to be measured is input into a tactile SR model, and an HR tactile pattern of the contact surface to be measured is output.

The original LR tactile pattern acquired by the tactile sensor at the current time is input into the SR model. The model outputs a corresponding HR tactile pattern according to a mapping relationship learned previously, so as to realize real-time tactile pattern SR. FIG. 2 shows the flow of the whole tactile SR.

In order to solve the problem that the resolution of the taxel-based tactile sensor is too low, the present disclosure provides a deep learning-based tactile SR reconstruction technology, which can effectively restore the shape of the contact surface and improve the resolution of the tactile sensor. The technology specifically includes two parts, that is, a method for acquiring HR tactile data by using an LR tactile sensor and deep learning-based tactile pattern SR.

The present disclosure can acquire HR tactile data by only using the taxel-based tactile sensor. The resolution of the tactile sensor is improved, and meanwhile, the characteristics of the sensor being light, flexible, and easy to be integrated into devices, such as a robot are still maintained.

Embodiment 2

Figure 9:
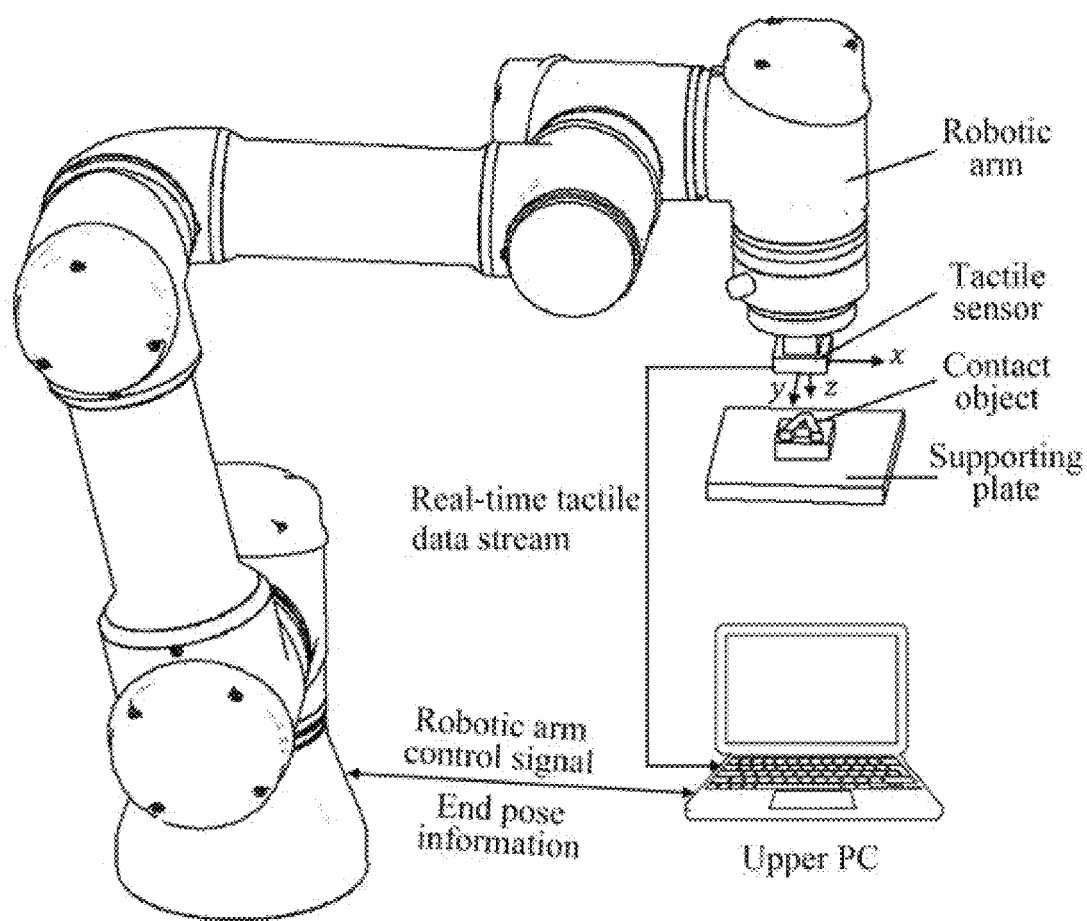
FIG. 9 is a structural diagram of a tactile pattern SR acquisition system provided by Embodiment 2 of the present disclosure.

Embodiment 2 of the present disclosure provides a tactile pattern SR acquisition system. As shown in FIG. 9, the acquisition system includes: a robotic arm, a tactile sensor, and an upper PC.

The tactile sensor is mounted at an end of the robotic arm. Both a control end and a signal output end of the robotic arm are connected to the upper PC. The upper PC is used for receiving the coordinates of the center point of the tactile sensor and controlling the robotic arm to move according to a preset acquisition path according to the coordinates of the center point of the tactile sensor. A signal output end of the tactile sensor is connected to the upper PC. The upper PC is used for receiving the tactile data, acquired by the tactile sensor, of the contact surface after the tactile sensor is in contact with the contact surface, and reconstructing an HR tactile pattern of the contact surface according tactile data and the coordinates of the center point of the tactile sensor.

Exemplarily, the upper PC includes: a sampling module, a tag acquisition module, a data set construction module, a training module, and an application module.

The sampling module is used for obtaining tactile data and coordinates of the center point of a tactile sensor at each sampling of each contact surface. The tag acquisition module is used for registering all sampled tactile data of each contact surface according to the coordinates of the center point of the tactile sensor at each sampling, so as to obtain an HR tactile pattern sample corresponding to the contact surface. The data set construction module is used for selecting the tactile data sampled each time in a central area of the contact surface and the HR tactile pattern sample corresponding to the contact surface to form a data pair, and constructing a tactile SR data set. The training module is used for training a deep learning neural network model by using a supervised machine learning method according to the tactile SR data set, so as to obtain a tactile SR model. The application module is used for inputting the tactile data, acquired by the tactile sensor, of a contact surface to be measured into a tactile SR model, and outputting an HR tactile pattern of the contact surface to be measured.

The tactile pattern SR acquisition system of the present disclosure is used for sampling the contact surface for a plurality of times and recording data. The tactile sensor is mounted at an end of the robotic arm, and the tactile data is acquired through the movement of the robotic arm.

The embodiments of the present disclosure are described above in combination with the accompanying drawings, but the present disclosure is not limited to the above-mentioned specific implementation manners. The above-mentioned specific implementation manners are only illustrative rather than restrictive. Inspired by the present disclosure, those of ordinary skill in the art can still derive a plurality of variations without departing from the essence of the present disclosure and the scope of protection of the claims. All these variations fall within the protection of the present disclosure.

What is claimed is:

1. A tactile pattern Super Resolution (SR) reconstruction method, comprising:
performing sampling on each contact surface for a plurality of times by using a tactile sensor, so as to obtain tactile data and coordinates of the center point of the tactile sensor at each sampling of each contact surface;
registering all sampled tactile data of each contact surface according to the coordinates of the center point of the tactile sensor at each sampling, so as to obtain a High Resolution (HR) tactile pattern sample corresponding to the contact surface;
selecting the tactile data sampled each time in a central area of the contact surface and the HR tactile pattern sample corresponding to the contact surface to form a data pair, and constructing a tactile SR data set;
training a deep learning neural network model by using a supervised machine learning method according to the tactile SR data set, so as to obtain a tactile SR model; and
inputting the tactile data, acquired by the tactile sensor, of a contact surface to be measured into a tactile SR model, and outputting an HR tactile pattern of the contact surface to be measured;
wherein the registering all sampled tactile data of each contact surface according to the coordinates of the center point of the tactile sensor at each sampling, so as to obtain an HR tactile pattern sample corresponding to the contact surface specifically comprises:
setting acquisition times I along an X axis and acquisition times J along a Y axis of a robotic arm;
averaging the plurality of sets of tactile data acquired at each sampling after high pass filtering, and taking an average value as the tactile data of each sampling;
registering by using a formula $T^{HR}$ [I×m+i, J×n+j]=$T^{i,j}$ [m,n] according to the tactile data of each sampling of each contact surface and the coordinates of the center point of the tactile sensor, so as to obtain an initial HR tactile pattern sample, wherein [m, n] represents the [m, n] th taxel of the tactile sensor, $T^{HR}$ [I×m+i, J×n+j] represents the x, y, and z-axis data corresponding to the [I×m+i, J×n+j]th pixel point of the HR tactile pattern, $T^{i,j}$ [m, n] represents the x, y, and z-axis data corresponding to the [m, n] th taxel when the tactile sensor samples for the ith time along the X axis and samples for the jth time along the Y axis; and
performing smoothing processing on the initial HR tactile pattern sample to obtain an HR tactile pattern sample of the contact surface.

2. The tactile pattern SR reconstruction method according to claim 1, wherein the performing sampling on each contact surface for a plurality of times by using a tactile sensor, so as to obtain tactile data and coordinates of the center point of the tactile sensor at each sampling of each contact surface specifically comprises:
respectively determining the preset distance $\Delta x$ of the tactile sensor moving once along the X axis and the preset distance $\Delta y$ of the tactile sensor moving once along the Y axis according to the resolution of the tactile sensor, the acquisition times I, and the acquisition times J;
mounting the tactile sensor at an end the robotic arm;
presetting a sampling position (x, y,$h_{init}$)=(0, 0, $h_{init}$) wherein the $h_{init}$ is the vertical distance from the tactile sensor to the contact surface;
enabling the robotic arm to drive the tactile sensor to move to a sampling position (x, y,$h_{init}$) above the contact surface, simultaneously, adjusting the Z axis at the end of the robotic arm to be perpendicular to a horizontal plane, and recording the coordinates of the center point of the tactile sensor;
controlling the robotic arm to move downward until the tactile sensor is in contact with the contact surface, and acquiring a plurality of sets of tactile data;
enabling the robotic arm to move upward to return to the sampling position (x, y,$h_{init}$), so as to complete the $$\left[\frac{x}{\Delta x}, \frac{y}{\Delta y}\right] th$$

sampling;
increasing X by $\Delta x$, replacing the (x, y,$h_{init}$) with (x+$\Delta x$, y, $h_{init}$), returning to the step of "enabling the robotic arm to drive the tactile sensor to move to a sampling position (x, y,$h_{init}$) above the contact surface, and simultaneously, adjusting the Z axis at the end of the robotic arm to be perpendicular to a horizontal plane", until $$\frac{x + \Delta x}{\Delta x} > I,$$

and controlling the robotic arm to return to the sampling position (x, y,$h_{init}$); and increasing y by $\Delta y$, replacing the (x, y,$h_{init}$) with (x, y+$\Delta y$, $h_{init}$), returning to the step of "enabling the robotic arm to drive the tactile sensor to move to a sampling position (x, y, $h_{init}$) above the contact surface, and simultaneously, adjusting the Z axis at the end of the robotic arm to be perpendicular to a horizontal plane", until $$\frac{y + \Delta y}{\Delta y} > J,$$

stopping sampling, and obtaining the tactile data and coordinates of the center point of the tactile sensor at each sampling of the contact surface.

3. The tactile pattern SR reconstruction method according to claim 2, the respectively determining the preset distance $\Delta x$ of the tactile sensor moving once along the X axis and the preset distance $\Delta y$ of the tactile sensor moving once along the Y axis according to the resolution, the acquisition times I, and the acquisition times J of the tactile sensor specifically comprises:

determining the preset distance $\Delta x$ of the tactile sensor moving once along the X axis by using a formula d=$\Delta x \times$ I according to the resolution of the tactile sensor and the acquisition times I, wherein d represents the distance between adjacent taxels on the tactile sensor; and determining the preset distance $\Delta y$ of the tactile sensor moving once along the Y axis by using a formula d=$\Delta y \times$J according to the resolution of the tactile sensor and the acquisition times J.

4. The tactile pattern SR reconstruction method according to claim 3, wherein the selecting the tactile data sampled each time in a central area of the contact surface and the HR tactile pattern sample corresponding to the contact surface to form a data pair, and constructing a tactile SR data set specifically comprises:

selecting the tactile data acquired when the contact surface is within the range $$i \in \left\{\left\lfloor\frac{I}{2}\right\rfloor - \frac{K}{2}, \left\lfloor\frac{I}{2}\right\rfloor + \frac{K}{2}\right\} \text{ and } j \in \left\{\left\lfloor\frac{J}{2}\right\rfloor - \frac{K}{2}, \left\lfloor\frac{J}{2}\right\rfloor + \frac{K}{2}\right\}$$

as an input, and the HR tactile pattern sample of each contact surface as a tag to construct a tactile SR data set, wherein $\lfloor \ \rfloor$ represents rounding down, and K represents an error coefficient.

5. The tactile pattern SR reconstruction method according to claim 4, wherein the deep learning neural network model is a convolutional neural network-based deep learning model or a generative adversarial network-based deep learning model;

each of the convolutional neural network-based deep learning model and the generative adversarial network-based deep learning model comprises an upsampling layer, a feature extraction layer, and an output layer connected in sequence;

a loss function of the convolutional neural network-based deep learning model is $$\mathcal{L}_{CNN} = \mathcal{L}_{MSE} = \frac{1}{(M \times I) \times (N \times I)} \sum_{m=1}^{M} \sum_{n=1}^{N} \left(G_{\theta_G}(T^{LR}), T^{HR}\right)^2,$$

wherein (M,N) represents the resolution of the tactile sensor, $L_{CNN}$ represents the loss of the convolutional neural network-based deep learning model, $L_{MS\_E}$ represents a mean square error, $G_{\theta_G}(T^{LR})$ represents the HR tactile pattern predicted by the model, and $T^{HR}$ represents a real HR tactile pattern;

a loss function of the generative adversarial network-based deep learning model is $$\mathcal{L}_{GAN} = \mathcal{L}_{MSE} + 10^{-3} \cdot \mathcal{L}_{Gen} = \mathcal{L}_{MSE} + 10^{-3} \cdot \sum -\log D_{\theta_D}\left(G_{\theta_G}(T^{LR}_{x,y,z})\right),$$

wherein $\mathcal{L}_{GAN}$ represents the loss of the generative adversarial network-based deep learning model, $\mathcal{L}_{Gen}$ represents an adversarial loss term, $T_{x,y,z}^{LR}$ represents original Low Resolution (LR) x, y, and z-axis tactile data acquired by the tactile sensor, $G_{\theta_G}(T_{x,y,z}^{LR})$ represents an HR tactile pattern generated by a generative network, and $D_{\theta_D}(G_{\theta_G}(T_{x,y,z}^{LR}))$ represents the difference, determined by the discriminant network, between the predicted HR tactile pattern and the real HR tactile pattern.

6. A tactile pattern SR acquisition system, comprising: a robotic arm, a tactile sensor, and an upper Personal Computer (PC), wherein the tactile sensor is mounted at an end of the robotic arm;

both a control end and a signal output end of the robotic arm are connected to the upper PC; the upper PC is used for receiving the coordinates of the center point of the tactile sensor and controlling the robotic arm to move according to a preset acquisition path according to the coordinates of the center point of the tactile sensor;

a signal output end of the tactile sensor is connected to the upper PC;

wherein the upper PC comprises a memory which stores instructions and a processor, wherein when the instructions are executed, the upper PC is configured to perform following steps:

obtaining tactile data and coordinates of the center point of a tactile sensor at each sampling of each contact surface;

registering all sampled tactile data of each contact surface according to the coordinates of the center point of the tactile sensor at each sampling, so as to obtain an HR tactile pattern sample corresponding to the contact surface;

selecting the tactile data sampled each time in a central area of the contact surface and the HR tactile pattern sample corresponding to the contact surface to form a data pair, and constructing a tactile SR data set;

training a deep learning neural network model by using a supervised machine learning method according to the tactile SR data set, so as to obtain a tactile SR model; and inputting the tactile data, acquired by the tactile sensor, of a contact surface to be measured into a tactile SR model, and outputting an HR tactile pattern of the contact surface to be measured, wherein the registering all sampled tactile data of each contact surface according to the coordinates of the center point of the tactile sensor at each sampling, so as to obtain an HR tactile pattern sample corresponding to the contact surface specifically comprises:

setting acquisition times I along an X axis and acquisition times J along a Y axis of a robotic arm;

averaging the plurality of sets of tactile data acquired at each sampling after high pass filtering, and taking an average value as the tactile data of each sampling;

registering by using a formula $T^{HR}[I \times m+i, J \times n+j] = T^{i,j}[m, n]$ according to the tactile data of each sampling of each contact surface and the coordinates of the center point of the tactile sensor, so as to obtain an initial HR tactile pattern sample, wherein $[m, n]$ represents the $[m, n]$ th taxel of the tactile sensor, $T^{HR}[I \times m+i, J \times n+j]$ represents the x, y, and z-axis data corresponding to the $[I \times m+i, J \times n+]$ th pixel point of the HR tactile pattern, represents the x, y, and z-axis data corresponding to the $[m, n]$ th taxel when the tactile sensor samples for the ith time along the X axis and samples for the jth time along the Y axis; and performing smoothing processing on the initial HR tactile pattern sample to obtain an HR tactile pattern sample of the contact surface.

\* \* \* \* \*